United States Patent
Chang et al.

(10) Patent No.: US 6,856,331 B2
(45) Date of Patent: *Feb. 15, 2005

(54) SYSTEM AND METHOD OF ENRICHING NON-LINKABLE MEDIA REPRESENTATIONS IN A NETWORK BY ENABLING AN OVERLYING HOTLINK CANVAS

(75) Inventors: Sih-Pin Subrina Chang, Old Tappan, NJ (US); Shu-Chen Jeane S. Chen, Chappaqua, NY (US); Keeranoor G. Kumar, Randolph, NJ (US); James S. Lipscomb, Yorktown Heights, NY (US); Jai Menon, Croton-On-Hudson, NY (US); Liang-Jie Zhang, White Plains, NY (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 17 days.

(21) Appl. No.: 09/438,493

(22) Filed: Nov. 12, 1999

(65) Prior Publication Data

US 2003/0187811 A1 Oct. 2, 2003

(51) Int. Cl.⁷ .............................................. G06F 12/30

(52) U.S. Cl. ....................................... 345/762; 345/765

(58) Field of Search ................................ 345/762, 765, 345/744, 723, 853, 854; 707/102, 103, 104, 501.01

(56) References Cited

U.S. PATENT DOCUMENTS

| | | | |
|---|---|---|---|
| 5,841,978 A | 11/1998 | Rhoads | 395/200.47 |
| 5,918,012 A | 6/1999 | Astiz et al. | 395/200.47 |
| 6,182,140 B1 * | 1/2001 | Feig et al. | 709/226 |
| 6,317,761 B1 * | 11/2001 | Landsman et al. | 707/513 |
| 6,356,921 B1 * | 3/2002 | Kumar et al. | 707/501.01 |
| 6,456,307 B1 * | 9/2002 | Bates et al. | 345/838 |

OTHER PUBLICATIONS

K. G. Kumar et al., *The HotMedia Architecture: Progressive & Interactive Rich Media for the Interned*, pp. 1–23, (Jul. 1999).
http://www.ibm.com/hotmedia.
http://www.veon.com/v-active.

* cited by examiner

*Primary Examiner*—Cao (Kevin) Nguyen
(74) *Attorney, Agent, or Firm*—David M. Shofi

(57) ABSTRACT

Techniques are provided for enriching a non-linkable media representation presentable at a user terminal. In an illustrative embodiment, a hotlink canvas receives a hot link composition from an action enabling kernel and displays hotlinks in the hotlink canvas by overlaying a transparent panel on top of the non-linkable media whereby the non-linkable media becomes interactive and hyperlinkable. The hotlink canvas provides the following functions: query media current position and state; forward media position and state to the action enabling kernel; receive contending hotlink candidates from the action enabling kernel; pick one hotlink among a set of hotlink candidates; compose hotlinks by receiving hotlinks meta data from the action enabling kernel; display range contours of hotlinks on the media object by overlaying a hotlink canvas; perform an action specified; request the action enabling kernel to handle an action; and decouple hotlinks in otherwise linkable media.

47 Claims, 6 Drawing Sheets

OVERLAYING HOTLINK CANVAS ON NON-LINKABLE MEDIA

FIG. 2
HOTMEDIA FILE FORMAT

FIG. 3 HOTLINK CANVAS SCHEMATIC

FIG. 5A
OVERLAYING HOTLINK CANVAS ON NON-LINKABLE MEDIA

FIG. 5B
DECOUPLING HYPERLINKING FROM MEDIA TO HOTLINK CANVAS

SYSTEM AND METHOD OF ENRICHING NON-LINKABLE MEDIA REPRESENTATIONS IN A NETWORK BY ENABLING AN OVERLYING HOTLINK CANVAS

RELATED APPLICATIONS

1. Ser. No. 09/376,102 entitled "Framework For Progressive Hierarchical and Adaptive Delivery Rich Media Presentation and Associated Meta Data", filed Aug. 17, 1999 (SE9-98033).

2. Ser. No. 09/169,836 entitled "Personalizing Rich Media Presentations Based on User Response to the Presentation", filed Oct. 9, 1998 (SE9-98-028).

3. Ser. No. 09/100,418 entitled "Progressive to Relieve Delivery of Interactive Descriptions and Render it for Electronic Publishing of Merchandise" filed Jun. 20, 1998 (SE998-004).

4. Ser. No. 09/100,418 entitled "System And Method For Tracking User Interations And Navigation During Rich Media Presentations", filed Jun. 20, 1998 (SE9-99-011/ 1963–7344).

5. Ser. No. 09/569,875 entitled "Method for Non-linear Transformation and Interpolation for Unifying Hotlinks Between Heterogeneous Media Representations", filed May 12, 2000 (SE999-004).

All of the above-related applications are assigned to the same assignee as that of the present invention and are fully incorporated herein by reference.

BACKGROUND OF THE INVENTION

1. Field of the Invention

This invention relates to multimedia networks, systems and methods of operation. More particularly, the invention relates to systems and methods for enriching non-linkable media representations in a network by enabling an overlying hotlink canvas.

2. Description of Prior Art

In recent years, there has been a sizeable growth in the use of rich media over the World Wide Web as more and more individuals and institutions are beginning to realize the web's potential in a broad range of applications including electronic commerce, education training, news, etc. Examples of rich media include animation, audio, 3-D, panoramas, and videos. There H are two apparent clusters of rich media technology. One at the low end and the other at the high end which hampers effective deployment of some rich media in Internet based applications. The "low end" cluster comprises static images and simple non-interactive animations (typically animated GIs) which are easy to deploy and therefore have widespread usage. The "high end" clusters comprises richer and more natural experiences with larger interactivities, such as panoramas, 3-D, streaming audio/video, and composite media (e.g., MPEG-4), but the difficulty of deployment has limited widespread usage. A novel scaleable architecture called Hot Media bridges the gap between the two clusters thereby achieving widespread web penetration. A key feature of the technology is a suitable delivery file format that can contain heterogeneous compositions of media bit streams as well as meta data that defines behavior, composition and interaction semantics. The delivery file format enables the creation of lightweight single file representation of interactive, multistage presentations resulting in multiple media type contents. At the core of Hot Media client is a smart content algorithm that infers media types from the incoming data stream and fetches the media renderer components, user-interface components and hyperlinked action components, all just in time, resulting in progressive and context driven enrichment of the user experience. Further details related to Hot Media architecture are described in Ser. No. 09/376,102 entitled "Framework For Progressive Hierarchical and Adaptive Delivery Rich Media Presentation and Associated Meta Data", filed Aug. 17, 1999 (SE9-98-033), supra.

Often instances of rich media incorporate links to other presentations to expand a user experience. The process of clicking on a link in a media for transfer to the other presentation is referred to as "hot linking" or "hyper linking" is further described in U.S. Pat. No. 5,841,978 entitled "Networking Using Steganographically Embedded Data Objects" issued Nov. 24, 1998 and U.S. Pat. No. 5,918,012 entitled "Hyper Linking Time Based Data" issued Jan. 29, 1999. Sometimes times rich media are non-linkable to other presentations. It would be desirable to have non-linkable rich media supplemented to provide hot linking to other presentations. Alternatively, it would be desirable to de-couple hotlinking from media.

Typically, hot links have been tightly integrated into supported media. For example, NetShow available from Microsoft supports hot links in the temporal domain. All hot links are written to its AFS file format along with the media. RealNetwork G2 uses Synchronized Multimedia Integration Language (SMIL) for a composition of temporal hot links. Neither RealNetworks nor NetShow support hot links other than in the temporal domain. Veon's AX integration with RealNetwork G2 provides both spatial and temporal hot links and uses SMEL as output format. None of the above-mentioned supported media provide a generic plug and play framework for non-linkable media to become hyper linkable. Nor does such hot link support media provide, in real-time, a separate hot link meta data comprised in advance and delivered as a transparent panel or hot link canvas for implementation of hot linking in otherwise non-linkable media.

SUMMARY OF THE INVENTION

An object of the invention is a multimedia network and method of operation for enriching non-linkable media representation for hyperlinking.

Another object of the invention is a multimedia network and method of operation providing a generic plug and play framework for non-linkable media to become hyperlinkable.

Another object is a multimedia network and method of operation providing a hotlink canvas as an overlay on non-linkable media for hyperlinking.

Another object is a multimedia network and method of operation providing an overlay canvas for decoupling hot links in accompanying media.

Another object is a hot link canvas as an overlay in a multimedia network composed in advance and delivered with rich media for implementing hot linking in accompanying non-linkable media or de-coupling hotlinking in accompanying media otherwise linkable.

These and other objects, features and advantages are achieved in a network capable of providing rich media presentations. The network includes a network server and a client station and implements HotMedia architecture to transmit a presentation in rich media including non-linkable media from the server to the client station. The server transmits the presentation as a streaming file in a framework of frames including a header frame, thumbnail frame, meta frame, media frame and end-of-stream frame. The client station includes an action enabling kernel and a client master module. The action enabling kernel contains a table lookup of action triggering inputs and consequent action commands. The master module controls a selection process of the various types of media involved in the presentation. When a media frame is encountered the master module checks to determine that a media object has been created to handle the media frame. If not, the master fetches the media object from the server and creates an instance of the media object to render the media frames. The rich media file may also include meta frames with range and action subtypes for the media. The range and action frames are the meta data for hotlink compositions and actions. When the first meta frame is received, the master fetches the action enabling kernel and a hotlink canvas from the server. The master delivers the meta frames to the action enabling kernel. The hotlink canvas receives hotlink composition from the action enabling kernel and displays hotlinks by overlaying a transparent panel on top of the non-linkable media whereby the non-linkable media becomes interactive and hyperlinkable. The non-linkable media is not responsible to display hotlinks, track hotlinks or trigger actions on the hotlink The hotlink canvas performs the following functions: Query media current position and state; Forward media position and state to the action enabling kernel; Receive contending hotlink candidates from the action enabling kernel; Pick one hotlink among a set of hotlinks candidates; Compose hotlinks by receiving hotlink meta data from the action enabling kernel; Display range contours of hotlinks on the media object by overlaying a hotlink canvas; Perform an action specified; and Request the action enabling kernel to invoke an action. With the hotlink canvas, non-linkable media does not need to be aware of any hotlinks and corresponding action handling. The media can be plugged into the hotlink canvas framework and become interactive and hyperlinkable.

DESCRIPTION OF THE DRAWINGS

The invention will be further understood from the following detailed description of a preferred embodiment taken in conjunction with an appended drawing, in which.

DESCRIPTION OF PREFERRED EMBODIMENT

Figure 1:
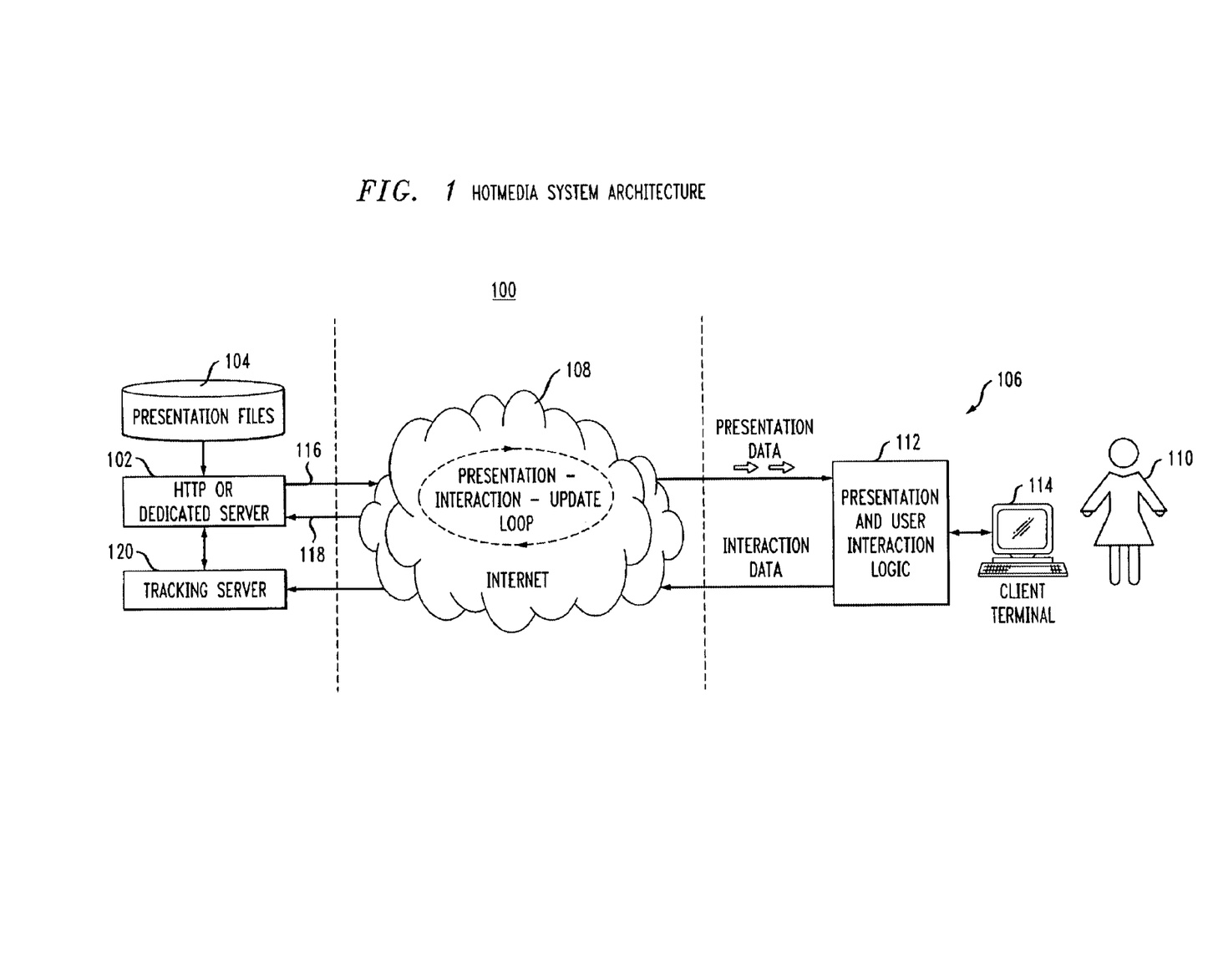
FIG. 1 is a representation of system incorporating HotMedia architecture and incorporating the principles of the present invention.

In FIG. 1, a multimedia information system 100 implements Hot Media architecture and includes an HTTP or dedicated server 102 coupled to a multimedia network 104, typically the Internet. The server is further coupled to a storage medium 106 which stores presentation files in rich media created by standard authoring tools for delivery to a client station 108 coupled to the network and serving a user 110. The client station includes a presentation and user interaction logic unit 112 accessed by the user through a client terminal device 114. The presentation files 104 are supplied to the client station as streaming data on presentation bus 116 The user's interaction with the presentation data is returned to the server 102 as interaction data on bus 118. The presentation files and interaction data are exchanged in the network between the server and the client station using standard HTTP protocols. A user interaction tracking server 120 monitors the user's intentions, preferences and attitudes with respect to the presentation files and exchanges data with the server 102. The tracking server is more fully described in Ser. No. 09/404,163 entitled "System And Method For Tracking User Interations And Navigation During Rich Media Presentations", filed Sep. 7, 1999 (SE9-99-011/1963–7344), supra.

Figure 2:
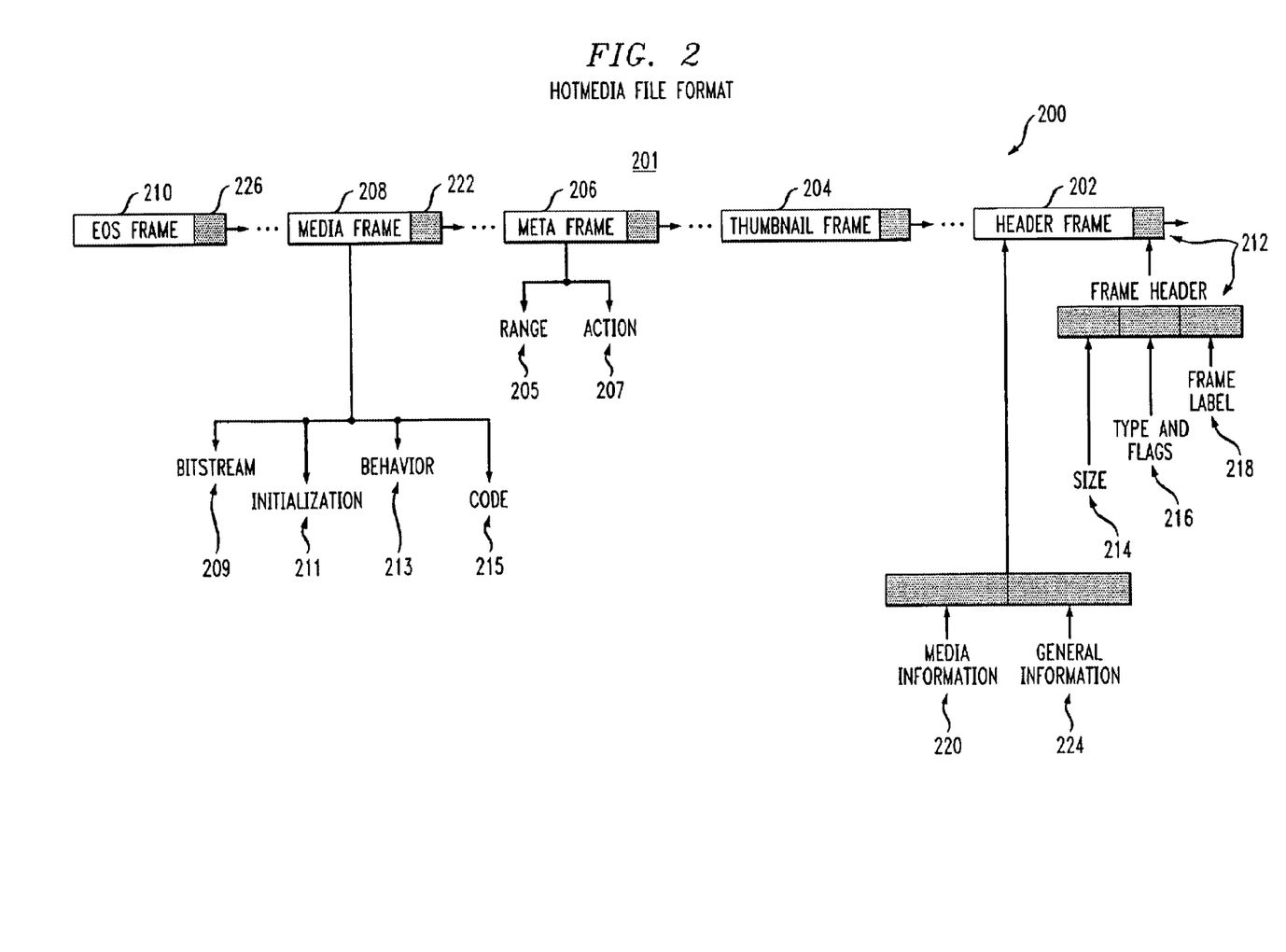
FIG. 2 is a representation of a HotMedia file format for streaming rich media for use in the system of FIG. 1.

FIG. 2 shows a Hot Media presentation file 200 in a framework 201 which is essentially a sequence of frames types comprising header 202, thumbnail 204, meta 206, media 208, and an end of stream 212. The first frame is the header frame 202. The header frame is actually followed by the thumbnail frame 204. After these frames a sequence of other frames occurs and in no pre-mandated order or number. The header frame 202 is the only one whose presence is mandatory in the format. The most degenerate yet useful version would have a header frame followed by a thumbnail frame 204. Media frames 208 appear in all other instances. Meta frames 206 are present only in cases where non-default behavior and configuration are desired on cases where hyper linked action semantics are to be incorporated. All frames have a similar 12 bit initial section that enables a uniform procedure for their identification to a type and frame label as well as the determination of their size. The Hot Media file format is created to have minimum overhead and maximum modularity. The format makes it suitable for optimal delivery of a low bandwidth as well as for rich experiences over high bandwidth.

The header frame 202 includes a frame header 212 which provides information about frame size 214, types and flags 216 and frame labels 218. The header frame 202 also includes media information 220 containing definition on different media tracks that may be contained in the file 200 General information 224 in the header frame 202 provides the class name of the code that renders the media type on the client station. When HotMedia kernel code on the client side parses the media track information on the file header and if it encounters the specification of a class name, the media type field is ignored and the code specified by the class name is sent from the server in order to render the data of the track in question. The class name permits the introduction of whole new media types into the presentation. No changes or additions to the client kernel code are needed so long as the media objects implements the interfaces specified in the HotMedia framework 201 for first class members of a media object set.

The thumbnail frames 204 carry a minimalistic representation of the information shared by the HotMedia file framework 201. For example, if the information carried in the file were a description of merchandise, the thumbnail would carry a single image. Thumbnail frames make possible providing the user a quick introduction to the subject with minimal code and data transfer. Since users pay attention to detail only when the subject is of some interest, it would be wasteful for such data and codes to enable anything beyond the initial experience unless an interest is indicated. In addition to a frame header, the thumbnail frames also carry parameters for producing image pan and animation effects on the single image (all not shown).

Meta frames 206 carry specification of non-media specific information pertaining to enablement of hyperlinked actions from media context and tracking of interaction. Action semantics associated with media segments can be expressed in HotMedia files 200 using range 205 and action 207 subtypes. Range frames 205 are made up of range records that identify and label spatio-temporal segments of media. A spatial range can be described by a rectangular or elliptical contour. Temporal ranges can refer to a time range in milliseconds for a real time media-like audio or a count range for non-real-time media like animation. The range specification can also express a combination of space and time.

Action records 207 may be pre-programmed into the HotMedia file 200 for the execution of many types of action in the context of a presentation. Action frames can carry multiple action records all pertaining to a single actionable context, namely the presentation of media segment as specified by a range. Action records are the specification mechanism for all types of actions that can be triggered during the context of presenting a certain media segment while in a certain state of the media object. Actions can belong to a variety of types that include LINK to specify hyperlinking; DISPLAY to specify the display of contours, cursor changes, etc; PLAY SOUND to create sound effects in various contexts; and TRACK to specify the tracking of interactions and events associated with a user experience. Also contained in an action record is the specification of an action trigger. The triggers for actions can be user interaction, presentation state updates or player state updates. An example would be the coming in to view of a certain segment of a presentation, the movement of mouse into a spatio-temporal range of a presentation, the click of the left mouse button within the present temporal range of the presentation, the completion of loading of a segment of the media data and so forth. Although the range record specifying a media segment associated with most action triggers are of type spatial, temporal or both, there are some situations where the range type is inconsequential. A range type DONTCARE is designed for such situations. An example is where the action is determined entirely by the internal state of the media object producing the completion of data loading trigger. The final piece of information contained in an action record is the data for action. The size of this data and its interpretation is different for each action type and subtype. The data information is where for example, the target URL string is found when the action type is LINK and the text string, font and color information when the action type is DISPLAY.

The media frame 208 includes a frame header 222 and in addition contains media bit stream data 209, initialization data 211, behavior data 213 and code 215. The behavior data or initialization data define the behavior and configuration of a corresponding media player respectively. Media bit stream data belonging to a particular media track can be carried over multiple frames and these frames can be interleaved with meta frames and frames belonging to other media tracks. Media frames are identified by frame type and track identifier as carried in their header 222. The frame type and track identifier enable true multiplexed delivery and hence ideal for static or dynamic proportioning of various media tracks over limited bandwidth. Media frames can also often contain codes 215 that render the media type on the client station. The code in turn can be physically present or could be a URL reference. When present, the code is separated from the file on the server side 102 (see FIG. 1), and thereafter the code or data can be made available for on demand delivery. In the case of a URL reference to code, the code is fetched from a remote HTTP server to be similarly made available on demand.

The end-of-stream frame 210 contains a frame header 226 and is a marker that signals the end of the entire presentation associated with a Hot Media file 200. Frames belonging to multiple media tracks and meta data can be multiplexed in the HotMedia file. The end of stream frame is valuable to the client station in recognizing the end of each HotMedia file data stream which may otherwise be impossible when stream initialization data for each stream do not announce their respective lengths.

Figure 3:
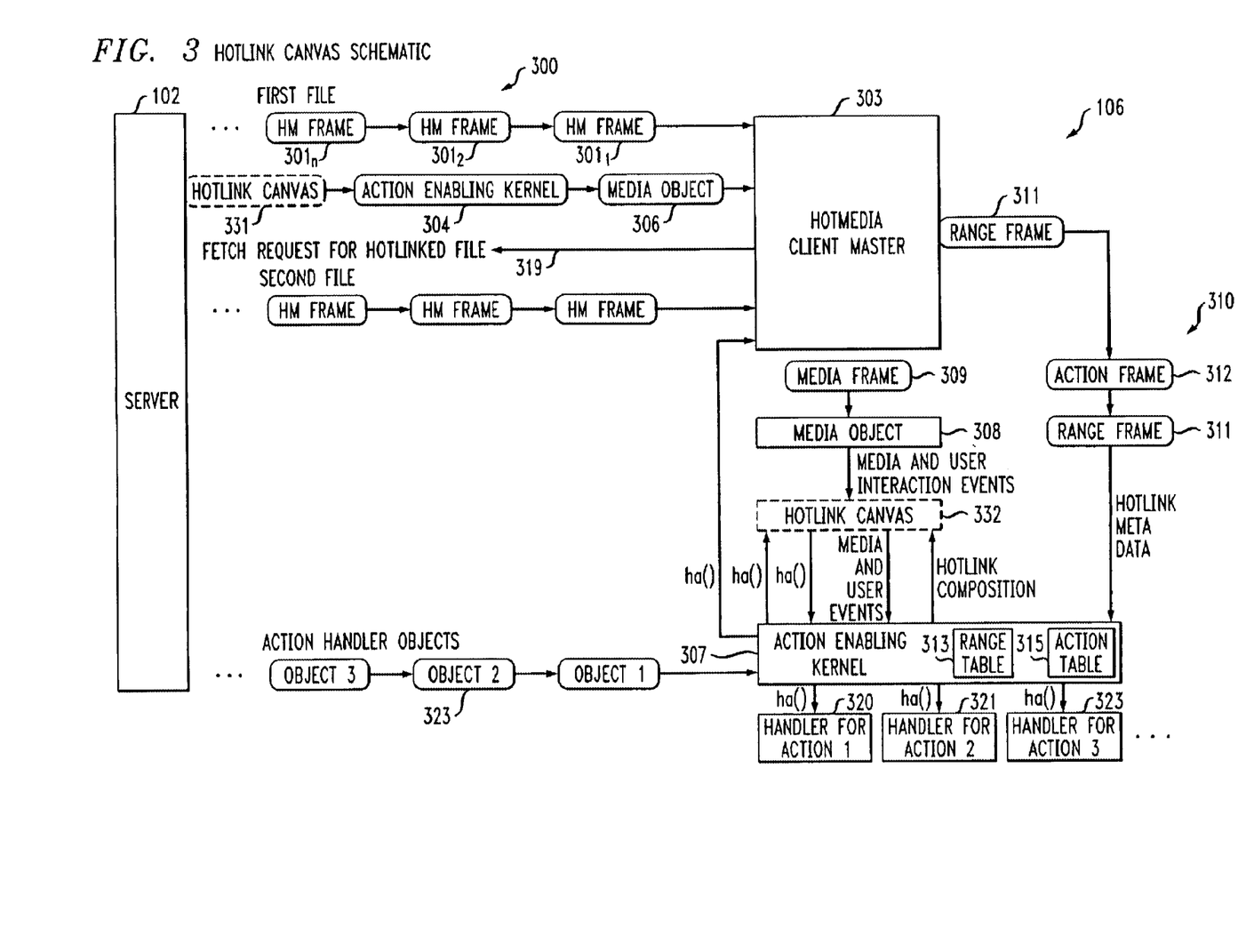
FIG. 3 is a representation of a client station for enriching non-linkable media representations by enabling an overlying and accompanying hotlink canvas of the non-linkable media for hyperlinking in the system of FIG. 1.

Turning to FIG. 3, the Client side station 106 will now be described in conjunction with processing the presentation file data stream 200. The server 102 provides a first streaming Hot Media file 300 comprising a series of frames $301_1 \ldots 301_n$, previously described in conjunction with FIG. 2. The frames 3011 . . . $301_n$ may contain meta frames with range and action subtypes. A hot media client master 303 receives the frames 300 and as soon as a meta frame is encountered with range and action subtypes, the master verifies to see if an action enabling kernel 305 has been created. If not, the master 303 obtains action enabling kernel code 304 and media object code 306 from the server 1021 instantiates the code 304 in an action enabling kernel 307 and displays the code 306 as a media object 308 on the client terminal 114 (see FIG. 1). The client master 303 delivers the sequence of frames 300 to their proper owner. Media frames 309 are delivered to the media object 308 handling the media track. Meta frames 310 of the range 311. Action 312 type is delivered to the action-enabling kernel 307; stored in range tables 313 and action tables 315.

The range table 313 and an action table 315 are updated based on meta frames included in the file 300. The action enabling kernel builds range and action tables out of the information contained in the range and action frames respectively. An entry is contained in the range table corresponding to each range record in the arriving frame. The information contained in the range record is used as data for the entry. The table contains entries corresponding to ranges responding to any media track in the file 300 and no particular order is mandated. Similarly, an entry is created in the action table corresponding to each action record in the arriving action frame. The information contained in the action record is used as data for the entry. A cross-reference index is also added to the range table to enable easy access of the description of the range with which the action in question is associated.

As the media object 308 receives media related data 309 from the client master and commences the rendering of the media it will also be receiving user input from mouse and keyboard interaction. The media object may also be undergoing internal state changes pertaining to completion of data loading, commencement or rendering and so forth. The media object can signal the occurrences of this user input or state changes to the action enabling kernel 307. On receiving them the action enabling kernel regards the signals as triggers and as the occasion to verify the presence of actionable situation. When relevant to the media object in question, triggers can be associated with the display of every new image, mouse activity within an applet space and media object state changes, such as the completion and loading of all images. Associated with the action enabling kernel are the action handlers 320, 321, 322 for responding to triggers having been initiated by the media object and action handler objects 323 provided by the server. For example, action handler 320 may perform a VIEW change On the client terminal 114 (See FIG. 1) in response to a change trigger. Action handler 321 may perform a DISPLAY. Action handler 322 may perform a LINK. Various other actions can be performed in response to triggers such as MOUSEMOVE, REPLACEURL, etc. Triggers generate other triggers depending on the context. For example, a MOUSE MOVE may cause a mouse to enter range or a mouse exit range depending on where the mouse was previously located.

Figure 5A:
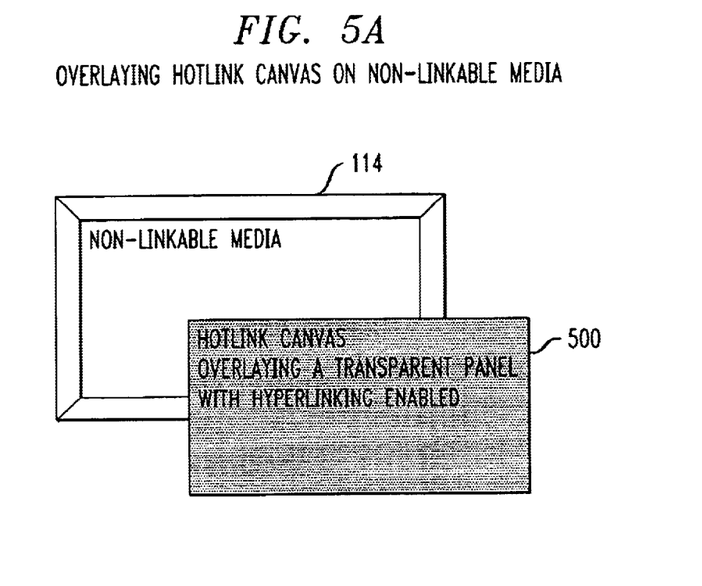
FIGS. 5A & B are a representation of a hotlink canvas generated in a system of FIG. 1 using the process of FIG. 4.

In those instances where HotMedia files are non-linkable media representations, i. e. there are no meta frames containing range and action records for hotlink composition, the master module 303 may enable the non-linkable media for hotlinking by fetching hotlink canvas code 331 from the server and instantiates the hotlink canvas object 332. In addition, a set of meta frames would be delivered to the action enabling kernel from the server for hotlink composition. The hotlink canvas creates a transparent panel 500 (See FIG. 5) which is overlayed on top of the media object. By receiving hotlink composition data from the action enabling kernel, the hotlink canvas displays hotlinks overlying the otherwise non-linkable media. The media is not responsible to display hotlinks, track hotlinks, or trigger actions on hotlinks. The media is only responsible to report its spatio-temporal position and current state whenever requested by the hotlink canvas. In effect, the hotlink canvas is a liaison between a media object and the action enabling kernel. The hotlink canvas performs the following functions:

1. Querying media current positions and state.

In order to display hotlinks properly the hotlink canvas requests for the current status of the media object frequently. The current status of the media object comprises any user interaction by either mouse or keyboard input, current mouse position, i. e. (x, y) coordinates, current temporal position in milliseconds, and the current state of the media object.

2. Forwarding media's position and state to the action enabling kernel.

The hotlink canvas sends the current status of the media object to the action enabling kernel to be verified if any hotlink(s) is triggered.

3. Receive contending hotlink candidates from the action enabling kernel.

The action enabling kernel picks a set of candidates from the range table and forwards them to the hotlink canvas. The ranges of all picked are matched to the one raised by the hotlink canvas.

4. Selecting one hotlink among a set of hotlink candidates.

The hotlink canvas may choose which hotlinks are triggered from candidates forwarded by the action enabling kernel.

5. Composing hotlinks by receiving hotlink meta data from the action enabling kernel.

The hotlink canvas receives meta data from the action enabling kernel and stores them internally for hotlink composition and displaying.

6. Displaying range contours of hotlinks on the media object by overlaying a transparent panel.

The hotlink canvas creates a transparent panel overlaying on top of the media object to display range contours of hotlinks without any awareness of the media object.

7. Performing an action specified.

For example, if the action type is DISPLAY and sub-type is RANGE_CONTOUR, the hotlink canvas is ideally suited to perform this action.

8. Requesting the action enabling kernel to handle an action.

Instead of performing an action, actions can be handled by one of action handlers provided by the action enabling kernel.

9. Unifying representations of hotlinks.

The hotlink canvas transforms media information represented in the media space to a uniform representation. The hotlinks are identified by a uniform procedure independent of non-linear representations of media in the context of the hotlink canvas.

Figure 4:
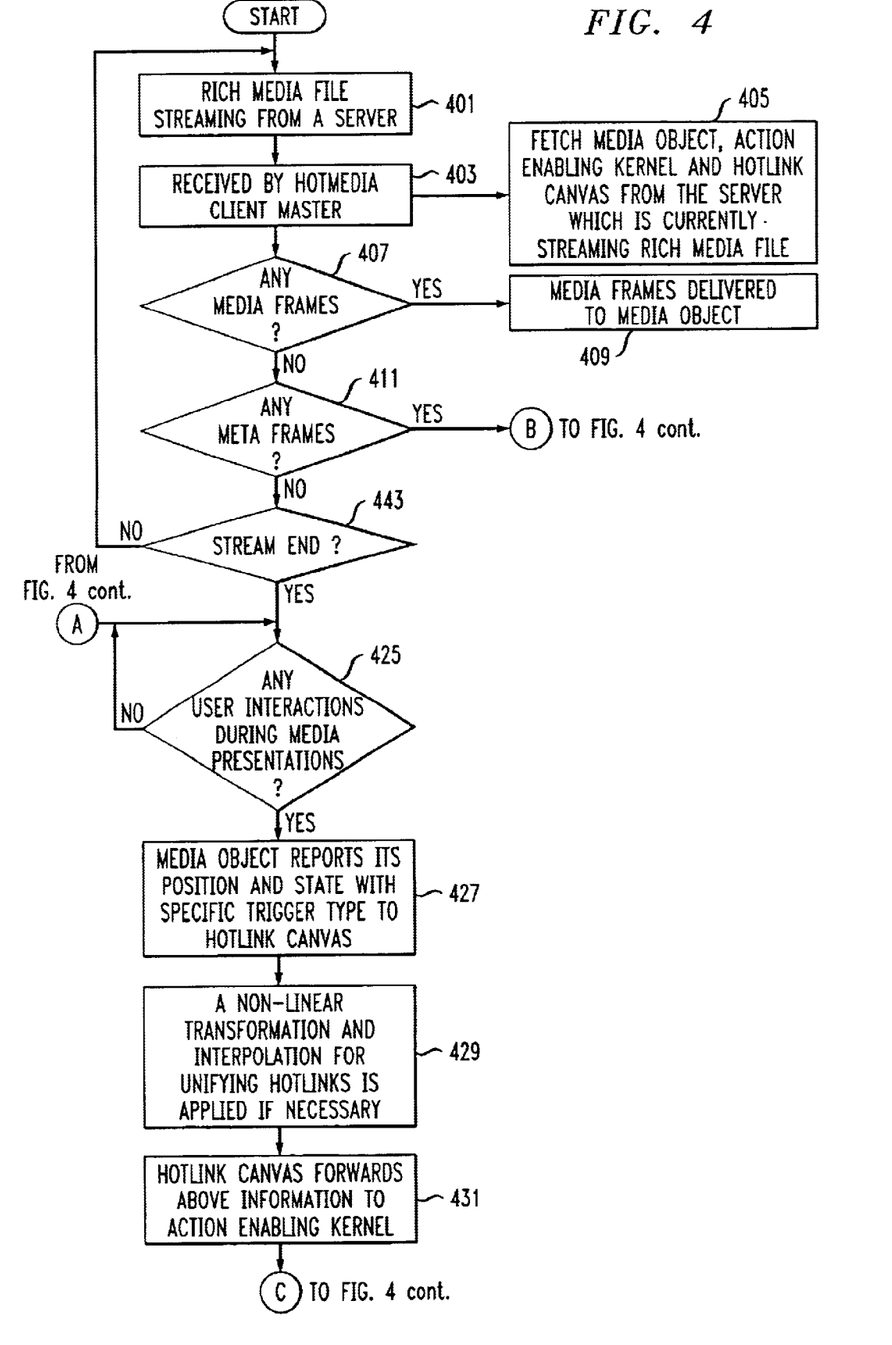
FIG. 4 is a flow diagram describing a method of operation for enriching otherwise non-linkable media for hyperlinking using an overlying, transparent, accompanying hotlink canvas in the system of FIG. 1.

In FIG. 4 a process 400 will be described in conjunction with FIGS. 1–3 for constructing a hotlink canvas enabling a non-linkable media representation for hyperlinking in a network. The process is entered at start point (S) after which a streaming rich media file 300 is received from the server 102 in block 401. The streaming rich media file is received by the HotMedia client master module 303 in block 403. The HotMedia client master module 303 starts to fetch the media object code 306, the action enabling kernel code 304 and the hotlink canvas code 331 from the server 102 in block 405 while the rich media file is streaming to the HotMedia client master. A test 407 is performed by the master module 303 to determine if any media frames 309 have been received. A "yes" condition delivers the media frames to the media object 308 in block 409, afterwhich the process returns to the entry point S. A "no" condition transfers the process to block 411. A test is performed in block 411 to determine if the file contains any meta frames. A "no" condition initiates a test in block 443 to determine if the streaming rich media file from the server 102 is complete. A "yes" condition in block 443 transfers the process to entry point A which will be described hereinafter. A "no" condition in block 443 transfers the process to block 401. Returning to block 411, a "yes" condition transfers the process to block 413 in which the meta frames are delivered to the action enabling kernel 307. The action enabling kernel in a test 415 determines if any hotlinks are present in the meta frames. A "no" condition transfers the process to entry point A. A "yes" condition transfers the process to blocks 417 and 419. In block 417 hotlink composition data in terms of range and action data from the action enabling kernel are entered in the hotlink canvas. In block 419 a test is performed to display any spatial hotlinks in the meta frame. The test 419 transfers the process to entry point A for a "no" condition. A "yes" condition transfers the process to block 421 in which the hotlink canvas transforms the information reported by the media object into a uniform representation. The representations of hotlinks in the context of the hotlink canvas are unified and independent of non-linearities of the media. In block 423 range contours of the hot links are displayed by overlaying a transparent panel as a hotlink canvas on top of the media object after which the process transfers to entry point A.

At entry point A test 425 is performed to determine if any user interaction has occurred during the media presentation. A "no" condition cycles the process to entry point A. A "yes" condition transfers the process to block 427 in which the media object 308 reports its position and states with specific trigger types to the hotlink canvas. In block 429 the hotlink canvas performs a non-linear transformation and interpolation to unify hotlink representations over non-linear media if necessary. In block 431 the hotlink canvas forwards the information to the action enabling kernel 307. In block 433 the action enabling kernel sends back a set of contending hotlink candidates to the hotlink canvas. The hotlink canvas picks one hotlink from a set of hotlink candidates based on the range and action data received from the action enabling kernel in block 435. A test is performed in block 437 to determine if the corresponding actions are ideally suited to be performed by the hotlink canvas itself. A "yes" condition transfers the process to block 441 in which the actions are carried by the hotlink canvas after which the process transfers to entry point A. A "no" condition initiates a hotlink canvas request to the action enabling kernel to perform a specific action in block 439 after which the process transfers to entry point A. The action enabling kernel determines if any actions need to be executed by specific action handlers 320–322. Those actions would be forwarded to action handlers 320–322 to be executed. The process remains in a waiting condition at entry point A after all actions have been performed until user interaction occurs in the media presentation after which blocks 425–441 are repeated or another streaming rich media file is received from the server after which the entire process is repeated beginning with step 401 through 443 is performed.

Further details of unifying representations of hotlinks between non-linear media in block 421 and 429 are described in Ser. No. 09/569,875 entitled "Method for Non-linear Transformation and Interpolation for Unifying Hotlinks Between Heterogeneous Media Representations", filed May 12, 2000 (SE-99-004), supra.

In FIG. 5A, the client terminal 114 (See FIG. 1) displays non-linkable media representations (not shown) for incorporating hotlinks by an overlying transparent panel 501 as a hotlink canvas. The transparent panel is constructed by the hotlink canvas 332 and is juxtaposed with respect to the non-linkable media representation. The hotlinks can be incorporated into the panel 501 in accordance with the process 400 described in FIG. 4.

Figure 5B:
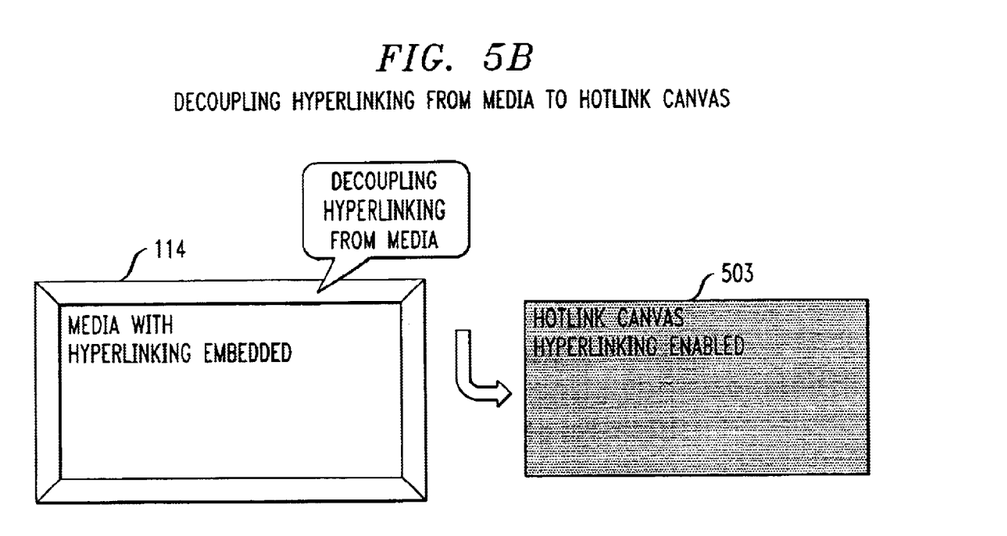

In FIG. 5B, a transparent panel 503 can serve as a hotlink canvas to decouple hyperlinks embedded in media displayed on the terminal 114. The media with embedded hyperlinks need to be reconstructed in the form of a streaming rich media file 300 described in FIG. 3. The process includes parsing media frames, separating hyperlinks information, authoring media frames in accordance with the file 300 and transforming hyperlinks information to meta frames in accordance with file 300.

While the invention has been shown and described in connection with a preferred embodiment various changes may be made therein without departing from the spirit and scope claimed and defined in the appended claims:

Further details of the construction and operation of the Client station in the Hot Media Architecture of FIG. 1 are described in Ser. No. 09/169,836 entitled "Personalizing Rich Media Presentations Based on User Response to the Presentation", filed Oct. 9, 1998 (SE998-028), supra.

We claim:

1. A method of enriching a non-linkable media representation presentable at a user termninal, the method comprising the steps of:
   obtaining the non-linkable media representation;
   obtaining code and, responsive to the code, generating a panel comprising at least one link to at least one other media representation; and
   overlaying the panel on the non-linkable media representation in accordance with a presentation at the user terminal, such that the non-linkable media representation becomes linkable to the at least one other media representation.

2. The method of claim 1, wherein the user terminal is associated with a client station.

3. The method of claim 2, wherein the non-linkable media representation and the code are obtained by the client station from at least one server via a network.

4. The method of claim 3, further comprising the step of the code instantiating a link canvas object at the client station, wherein the link canvas object generates the panel.

5. The method of claim 4, further comprising the step of the client station obtaining an action enabling kernel from the server.

6. The method of claim 5, further comprising the step of the link canvas object querying the non-linkable media representation for status.

7. The method of claim 6, further comprising the step of the link canvas object forwarding the status of the non-linkable media representation to the action enabling kernel.

8. The method of claim 7, further comprising the step of the link canvas object receiving one or more link candidates from the action enabling kernel.

9. The method of claim 8, further comprising the step of the link canvas object selecting a link from the one or more link candidates, the selected link being the at least one link.

10. The method of claim 8, further comprising the step of the link canvas object composing the at least one link in response to meta data received from the server via the action enabling kernel.

11. The method of claim 8, further comprising the step of the link canvas object generating the panel, wherein the panel displays range contours of the at least one link.

12. The method of claim 3, wherein the client station and the at least one server are compatible with a HotMedia architecture.

13. The method of claim 3, further comprising the step of the server producing and transmitting real time media presentations.

14. The method of claim 3, further comprising the step of the server providing a real-time encoding studio for transmitting both real-time non-linkable media and a set of meta information of hotlinks to a HotMedia client station.

15. The method of claim 14, wherein the real-time encoding studio provides a real-time authoring capability for multiplexing a non-linkable media and a set of meta information of hotlinks to a streaming rich media file in a HotMedia framework.

16. The method of claim 4, further comprising the step of the link canvas object performing a specified action.

17. The method of claim 4, further comprising the step of the link canvas object requesting a specified action to be performed.

18. The method of claim 4, further comprising the step of the link canvas object unifying representations of multiple links.

19. The method of claim 4, further comprising the step of the link canvas object decoupling at least one link from a linkable media representation.

20. The method of claim 1, wherein the code is obtained prior to the non-linkable media representation.

21. The method of claim 1, wherein the non-linkable media representation is obtained from a streaming media file.

22. The method of claim 1, wherein the at least one link is a hotlink.

23. The method of claim 1, wherein the at least one link is a hyperlink.

24. Apparatus for enriching a non-linkable media representation, the apparatus comprising:
   a client station configured to: (i) obtain the non-linkable media representation; (ii) obtain code and, responsive to the code, generate a panel comprising at least one link to at least one other media representation; and (iii) overlay the panel on the non-linkable media representation in accordance with a presentation at a user terminal of the client station, such that the non-linkable media representation becomes linkable to the at least one other media representation.

25. The apparatus of claim 24, wherein the non-linkable media representation and the code are obtained by the client station from at least one server via a network.

26. The apparatus of claim 25, wherein the code instantiates a link canvas object, and the link canvas object generates the panel.

27. The apparatus of claim 26, wherein the client station is further configured to obtain an action enabling kernel from the server.

28. The apparatus of claim 27, wherein the link canvas object queries the non-linkable media representation for status.

29. The apparatus of claim 28, wherein the link canvas object forwards the status of the non-linkable media representation to the action enabling kernel.

30. The apparatus of claim 29, wherein the link canvas object receives one or more link candidates from the action enabling kernel.

31. The apparatus of claim 30, wherein the link canvas object selects a link from the one or more link candidates, the selected link being the at least one link.

32. The apparatus of claim 30, wherein the link canvas object composes the at least one link in response to meta data received from the server via the action enabling kernel.

33. The apparatus of claim 30, wherein the link canvas object generates the panel, wherein the panel displays range contours of the at least one link.

34. The apparatus of claim 26, wherein the link canvas object performs a specified action.

35. The apparatus of claim 26, wherein the link canvas object requests a specified action to be performed.

36. The apparatus of claim 26, wherein the link canvas object unifies representations of multiple links.

37. The apparatus of claim 26, wherein the link canvas object decouples at least one link from a linkable media representation.

38. The apparatus of claim 25, wherein the client station and the at least one server are compatible with a HotMedia architecture.

39. The apparatus of claim 24, wherein the code is obtained prior to the non-linkable media representation.

40. The apparatus of claim 24, wherein the non-linkable media representation is obtained from a streaming media file.

41. The apparatus of claim 24, wherein the at least one link is a hotlink.

42. The apparatus of claim 24, wherein the at least one link is a hyperlink.

43. Apparatus for use in enriching a non-linkable media representation at a client station, the apparatus comprising:

a server configured to: (i) provide the non-linkable media representation to the client station; and (ii) provide code to the client station, such that the client station may, responsive to the code, generate a panel comprising at least one link to at least one other media representation, and overlay the panel on the non-linkable media representation in accordance with a presentation at a user terminal of the client station, such that the non-linkable media representation becomes linkable to the at least one other media representation.

44. The apparatus of claim 43, wherein the server is further configured to produce and transmit real time media presentations.

45. The apparatus of claim 43, wherein the server is further configured to provide a real-time encoding studio for transmitting both real-time non-linkable media and a set of meta information of hotlinks to a HotMedia client station.

46. The apparatus of claim 45, wherein the real-time encoding studio provides a real-time authoring capability for multiplexing a non-linkable media and a set of meta information of hotlinks to a streaming rich media file in a HotMedia framework.

47. An article of manufacture for enriching a non-linkable media representation presentable at a user terminal, comprising a machine readable medium containing one or more programs which when executed implement the steps of:

obtaining the non-linkable media representation;

obtaining code and, responsive to the code, generating a panel comprising at least one link to at least one other media representation; and overlaying the panel on the non-linkable media representation in accordance with a presentation at the user terminal, such that the non-linkable media representation becomes linkable to the at least one other media representation.

* * * * *

UNITED STATES PATENT AND TRADEMARK OFFICE
CERTIFICATE OF CORRECTION

PATENT NO. : 6,856,331 B2
DATED : February 15, 2005
INVENTOR(S) : Chang et al.

It is certified that error appears in the above-identified patent and that said Letters Patent is hereby corrected as shown below:

Title page,
Item [75], Inventors, delete "Shu-Chen Jeane S. Chen" and insert -- Shu-Chun Jeane S. Chen --.
Item [56], References Cited, OTHER PUBLICATIONS, under "http://www.veon.com/v-active", insert the following:
-- http://www.traingsupersite.com/realplayerG2/ --

Column 1,
Line 47, delete "H" after the word "There".

Column 2,
Line 30, delete "AX" after the word "Veon's".
Line 32, delete "SMEL" and insert -- SMIL --.

Column 6,
Line 25, delete "1021" and insert -- 102; --.

Signed and Sealed this

Seventeenth Day of May, 2005

JON W. DUDAS
*Director of the United States Patent and Trademark Office*